United States Patent

Rylander

[19]

[11] Patent Number: 6,111,976
[45] Date of Patent: Aug. 29, 2000

[54] SYSTEM AND METHOD FOR HANDWRITTEN CHARACTER RECOGNITION AND QUALIFICATION

[76] Inventor: John E. Rylander, 4726 NW 13th Ave., Rochester, Minn. 55901

[21] Appl. No.: 08/963,665

[22] Filed: Nov. 3, 1997

Related U.S. Application Data

[60] Provisional application No. 60/030,023, Nov. 4, 1996.

[51] Int. Cl.[7] .................................................. G06K 9/00
[52] U.S. Cl. ........................... 382/114; 382/187; 434/112
[58] Field of Search .................................. 382/185, 186, 382/187, 189, 227, 156, 158, 114; 434/85, 88, 90, 112, 155, 159

[56] References Cited

U.S. PATENT DOCUMENTS

| | | | |
|---|---|---|---|
| 4,495,646 | 1/1985 | Gharachorloo | 382/13 |
| 4,641,354 | 2/1987 | Fukunaga et al. | 382/13 |
| 4,685,142 | 8/1987 | Ooi et al. | 382/13 |
| 4,817,034 | 3/1989 | Hardin, Sr. et al. | 382/2 |
| 4,829,583 | 5/1989 | Monroe et al. | 382/185 |
| 4,901,358 | 2/1990 | Bechet | 382/3 |
| 5,001,765 | 3/1991 | Jeanty | 382/9 |
| 5,022,086 | 6/1991 | Crane et al. | 382/2 |
| 5,029,223 | 7/1991 | Fuiisaki | 382/13 |
| 5,121,442 | 6/1992 | Togawa | 382/13 |
| 5,267,327 | 11/1993 | Hirayama | 382/187 |
| 5,347,589 | 9/1994 | Meeks et al. | 382/3 |
| 5,390,260 | 2/1995 | Bezek | 382/13 |
| 5,615,283 | 3/1997 | Donchin | 382/187 |
| 5,666,438 | 9/1997 | Beernick et al. | 382/187 |

*Primary Examiner*—Bhavesh Mehta
*Attorney, Agent, or Firm*—Paul W. O'Malley; Susan L. Firestone

[57] ABSTRACT

The invention provides implementation of the pedagogic method of the Orton-Gillingham Approach by providing orthographic handwriting recognition, that is recognizing and pedagogically evaluating handwriting. This is done by noting, remediating or rejecting letters constructed by students which are pedagogically nonnormative in appearance, sequence of construction or both, even if the end appearance is clearly recognizable, including the possibility that the letter is perfect in end appearance.

15 Claims, 12 Drawing Sheets

SYSTEM AND METHOD FOR HANDWRITTEN CHARACTER RECOGNITION AND QUALIFICATION

REFERENCE TO RELATED APPLICATION

This patent is related to provisional application Ser. No. 60/030,023 filed Nov. 4, 1996.

BACKGROUND OF THE INVENTION

1. Field of the Invention

The present invention relates to a handwritten character recognition and qualification and more particularly to implementation of handwriting recognition and qualification within a pedagogical reading and writing system implemented on a multi-media personal computer.

2. Description of the Problem

The Orton-Gillingham Approach, as outlined by the International Dyslexia Association (formerly the Orton Dyslexia Society) includes eight essential instructional elements. The elements are: (1) Multisensory—instruction involving the immediate, intensive, and continuous interaction between what the student is seeing, hearing, and feeling in the speech mechanisms and the writing hand. All the language elements taught are reinforced by having the student listen, speak, read and write; (2) Alphabetic/Phonetic—sound-symbol associations along with linguistic rules and generalizations are introduced in a linguistically logical, understandable order. The essence of the phonetic approach is to make letter-to-sound connections as simple and comprehensive as possible; (3) Synthetic/Analytic—the student is taught how to blend sounds together; (4) Structured—the student learns one sound association, linguistic rule, or nonphonetic word and practices using it with previously taught material until it is secure before learning the next piece; (5) Sequenced—linguistic concepts are taught in a sequence which will minimize potentially confusing elements; (6) Cumulative—the student should be asked to use each newly introduced element while reinforcing others that have been taught; (7) Repetitive—the concepts are repeated until the student gains mastery; (8) Cognitive—the student should understand the "linguistic logic" underlying word formations and patterns and be able to demonstrate that understanding while writing words.

Implementation of an automated, student-responsive tutoring program using the Orton-Gillingham approach requires implementation of a handwritten-character recognition engine. Many patents deal with handwriting analysis programs which identify characters. Some of the features of these documents are usable with an automated implementation of the Orton-Gillingham approach, e.g. light pens and scanned writing tablets (i.e. some sort of digitizer pad) and apparatus for the immediate redisplay of what has been written. U.S. Pat. No. 5,121,442 to Togawa et al. is a representative teaching of these sorts of features.

However, existing handwriting recognition engines emphasize identification of a letter rather than qualifying the handwritten characters against normative standards. Nor are the prior art references known to the present inventor directed to meeting corrective demands of a pedagogical system. The problem is not one of training the computer to read whatever students write, nor of training students to write so that the computer can identify what they have written; rather it is one of training students, particularly students with particular learning disabilities, to read and write, and to that end, to hand-write in consistent and kinesthetically unambiguous ways. To accomplish this, the handwriting recognition engine must produce data by which the progress of the student may be quantified and guide the student toward correcting his or her handwriting.

What is needed is a letter (or phonic character) stroke analysis and appearance qualification engine which can both recognize the letter formed and evaluate the quality of the letter in terms both of its final appearance as well as how it was constructed.

SUMMARY OF THE INVENTION

It is an object of the present invention to provide a multisensory teaching program.

It is a further object of the invention to provide a handwriting recognition engine for use in a computerized implementation of the Orton-Gillingham approach for reading and writing instruction.

It is still another object of the present invention to provide character qualification measurement against a plurality of normative and nonnormative model characters.

The invention provides supports a structured-phonetic, multisensory teaching program which implements in a computer driven interface many components of the Orton-Gillingham approach of reading instruction, particularly for individuals with dyslexia. Enhanced reading, writing, and spelling instructional effectiveness for parents, tutors, and teachers are effected through consistent reinforcement of linguistic concepts and rules with a rotating word bank. The invention supports implementation of the pedagogic method of the Orton-Gillingham approach by providing orthographic handwriting recognition, that is, recognizing and pedagogically evaluating handwriting. This is done by noting, remediating, or rejecting letters constructed by students which are pedagogically nonnormative in appearance, sequence of construction, or both, even if the end appearance is clearly recognizable, including the possibility that the letter is perfect in end appearance.

DETAILED DESCRIPTION OF THE INVENTION

Figure 1:
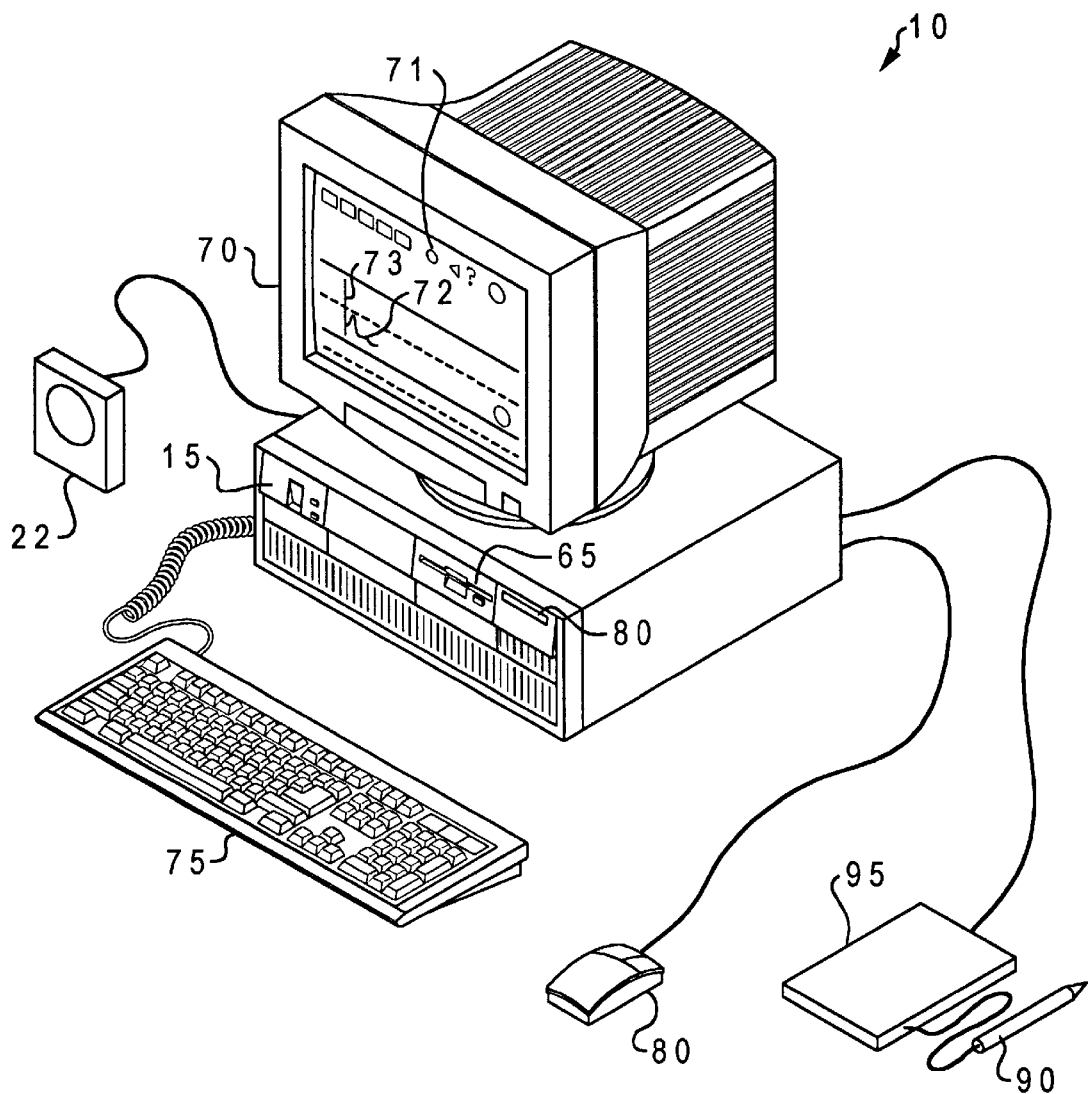
FIG. 1 is a perspective view of a personal computer suitable for use in implementing the present invention.
Figure 2:
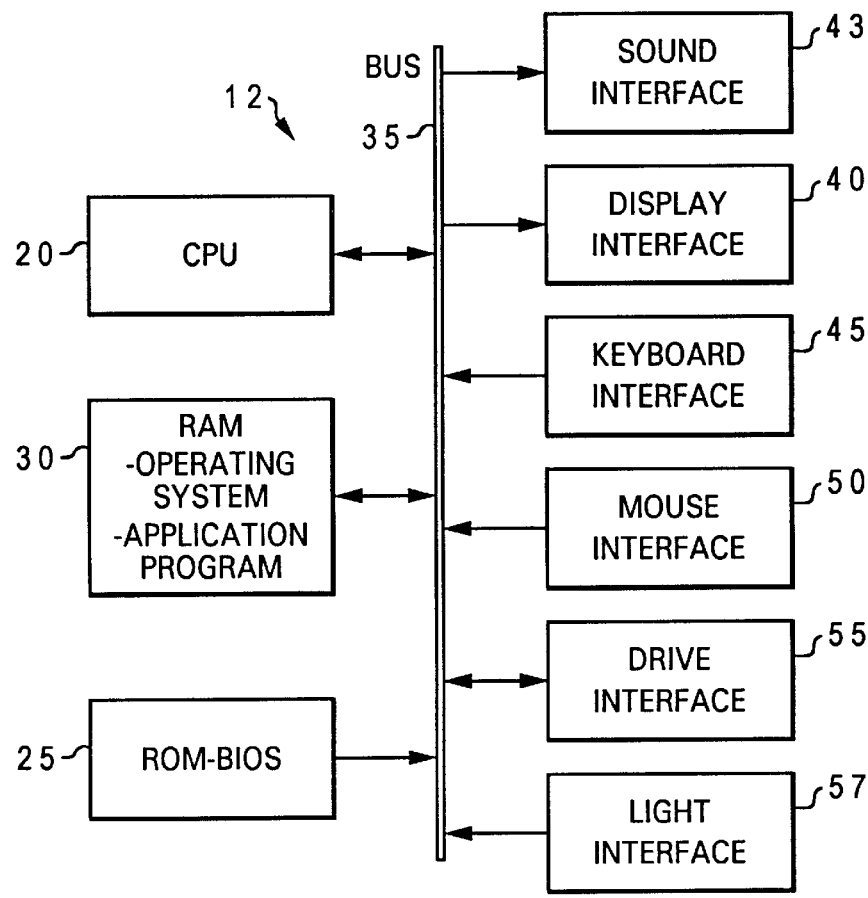
FIG. 2 is a block diagram showing the principal functional components of a personal computer utilized to practice the method of the present invention.

FIG. 1 illustrates an IBM compatible personal computer 10 suitable for implementing the present invention. Computer 10 includes a plurality of drives 60, 65, mounted in chassis 15 and physically connected to a computer motherboard or functionally comparable structure (representationally depicted in FIG. 2) through a drive interface 55 (FIG. 2). The drives 60, 65 may include one or more of the following peripheral devices, a floppy drive, a hard drive, a CD-ROM drive, or a tape drive. Drives 60, 65 provide non-volatile storage of data and programs on magnetic or optical media from which the computer 10 may read and, in most cases, to which it can write data. The personal computer 10 may display various data and defines areas for the user input of data on a display 70 by imaging a graphical user interface (GUI) shell on the display. A user enters commands and other information using keyboard 75, a pointing device such as a mouse 80 or puck, or a light pen 90 and pad 95. A speaker 22 allows audio playback.

A pedagogical interface 71 is illustrated as implemented on personal computer system 10. The student uses a stylus 90 on a digitizing tablet 95, or the mouse 80, or a light pen (not shown) to move cursor 72 and thereby construct a letter 73 which is formed on display 70 adjacent areas where cursor 72 is moved. Program 140 identifies the letter and determines the letter's quality against one or more norms.

Referring to FIG. 2, a motherboard 12 of the computer 10 is typically a large circuit board supporting most, or even all of the major data handling components of the computer. Computer 10 may in rare cases be constructed using an active or passive backplane, however the representation of the system architecture would not substantially change. Motherboard 12 provides transfer of data, address information and commands between read only memory (ROM) 25, system memory (random access memory-RAM) 30, a central processing unit (CPU) 20, a display interface or graphics board 40, a keyboard interface 45, a mouse or pointing device interface 50, a light pad interface 57, a sound interface 43 and a drive interface 55 over a system bus 35. Data, programs and the operating system are permanently stored on drives 60, 65 and are transferred by the system bus 35 from a drive interface 55 to RAM 30 when the computer is in use. When computer 10 is turned on, or reset, major components of the operating system are transferred from drives 60, 65 to RAM 30 resulting in CPU 20 executing system code to display visual elements of the graphical user interface of the operating system through display interface 40. Similarly, when an application program is started by a user or the system portions of the relevant code for the application program may be transferred from drives 60, 65 to RAM 30. The operating system typically will include device drivers for devices attached to the computer, including such peripheral devices as the mouse 80 and the light pad 95.

Figure 3:
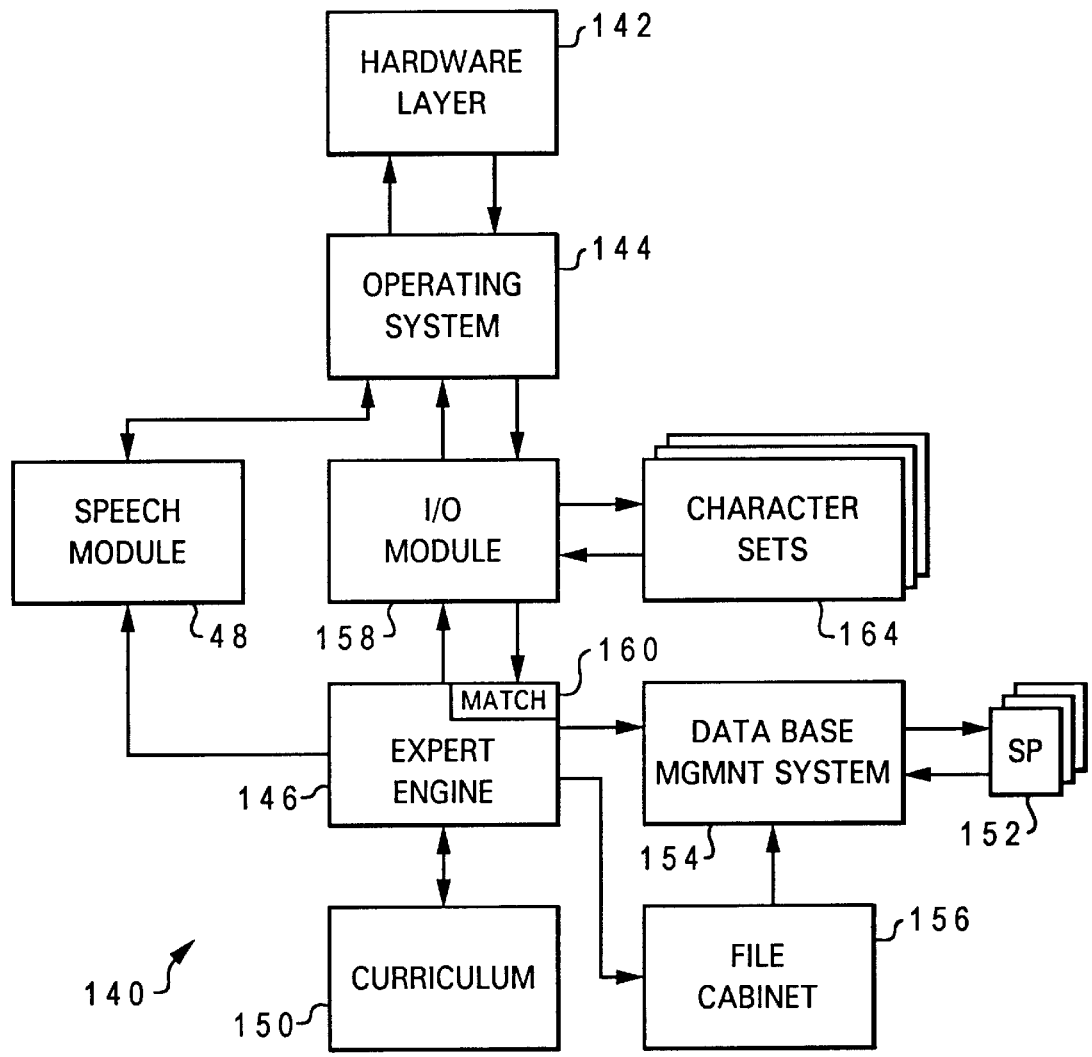
FIG. 3 is a block diagram of the system architecture of the invention, including hardware and software components.

FIG. 3 is a block diagram of the software system architecture for reading writing pedagogical system 140. Pedagogical system 140 communicates with input/output devices through operating system layer 144, which is preferably provided by one of the conventional desktop computer operating systems employing a graphical user interface, such as, MacOS, Dos/Windows 3.x, Windows 95 or OS/2. As is conventional in desktop computer systems, the operating system 144 controls the elements of the hardware layer 142 to which the input/output devices primarily relevant to the student user are attached, that is a display device 70, speaker 22, a CD-ROM drive and a coordinate input device, such as mouse 80. The program may be run over a network (not shown) or locally.

Pedagogical system 140 includes an expert engine 146 which coordinates the several modules of the pedagogical system. The modules include speaker module 148 which, under the direction of expert engine 146, locates and plays audio files from CD-ROM drive 145. The expert engine 146 tailors lessons for a student user by reference to a curriculum module 150 and a selected student profile 152, managed by a data base management system 154. Expert engine 146 maintains student profiles 152 according to progress of the student within the curriculum 150. A file cabinet module 156 loads and unloads data for the expert engine 146 and the database management system 154.

Expert engine 146 also coordinates the operations of speech module 148 with input/output module 158. This allows the program 140 to tell a student when to begin writing a particular letter. Input/output module directly accesses normative and substandard character sets 164 to permit both identification and a quality judgement of the letter. Character sets 164 are largely described by CAD files of normative and substandard letters. This allows additional sets of letters to be easily added without modification of the handwriting recognition engine. Data passes from input/output module 158 and the expert engine 146 through a match submodule 160 of the expert engine.

Expert engine 146 exchanges data with an input/output module 158 which is the location of the handwriting recognition and qualification operations of the present invention and coordinates events from the speech module 148 and input/output module 158. Input/output module 158 passes scoring data to the expert engine 146 through a match submodule 160. Input/output module 158 also passes data for display on display device 70. Input/output module also has access to normative and substandard character sets 164 used for handwritten character recognition and qualification. The character sets 164 contain information about the normative directions and magnitudes that form and determine the proper shape of the final letter. The direction and magnitude data may be expressed as ordered coordinate pairs or as vectors and magnitudes. The character sets 164 may be accessed both to illustrate how to draw the phonic character and to score a student submittal. Character sets 164 are largely conveniently stored as CAD files, allowing the easy addition of additional phonic character forms. File formats other than CAD may be used however.

Figure 4:
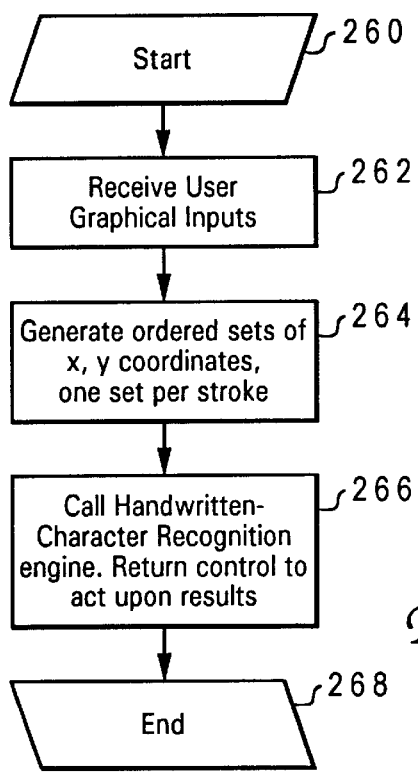
FIG. 4 is a high level flow chart of the computer implemented method of the invention.

FIG. 4 is a high level flowchart of a portion of the tutorial program in which the handwriting recognition engine is used. The program is initiated at step 260 and at step 262 it receives user graphical inputs. Next, at step 264, ordered sets of x,y coordinates for each stroke are generated. At step 264 the handwritten character recognition engine is called, and results are returned to the calling expert engine to act on the results. Step 268 represents exit from this portion of the program.

Figure 5A:
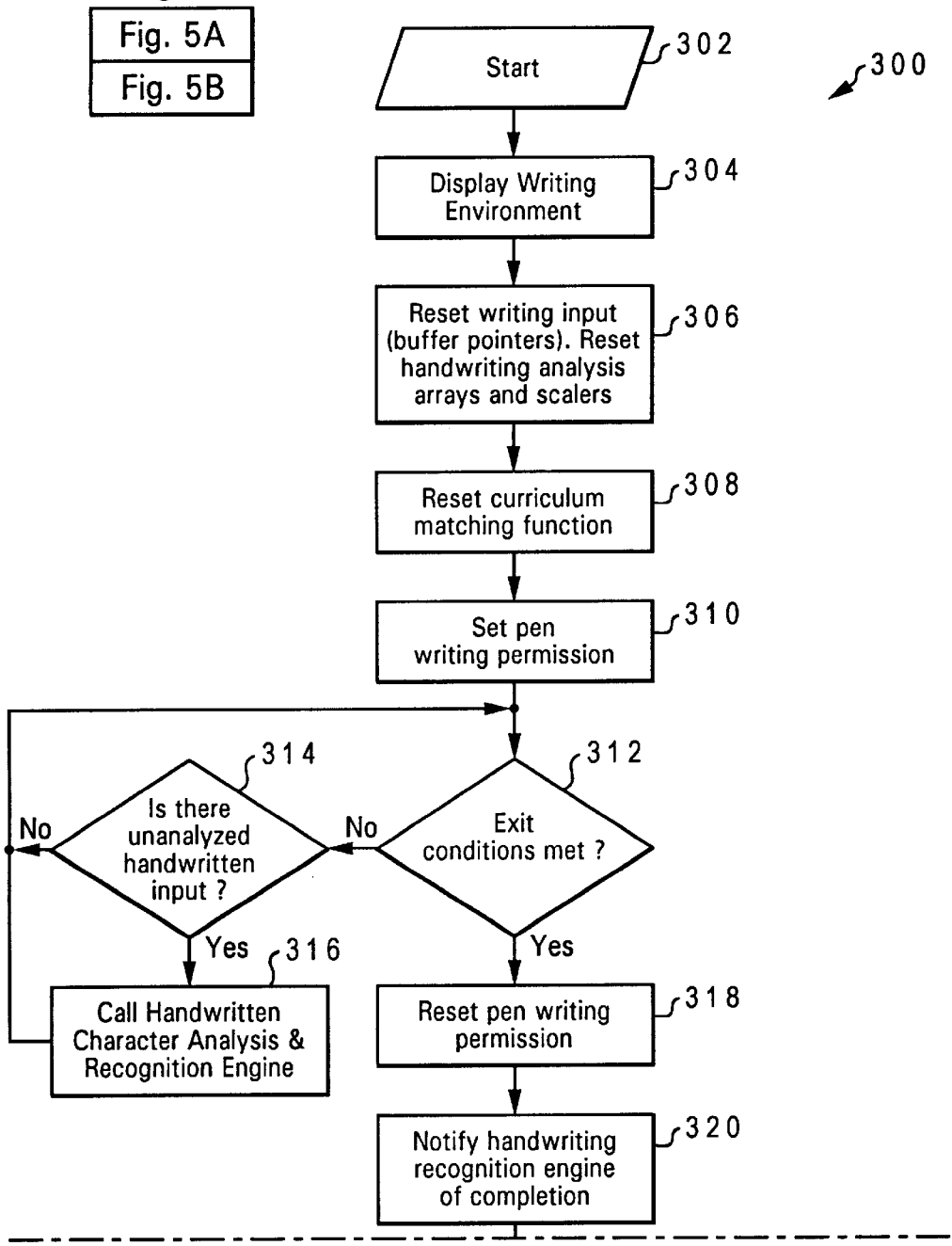
FIG. 5 is a detailed flow chart illustrating the control steps for the computer implemented method of the invention.
Figure 5B:
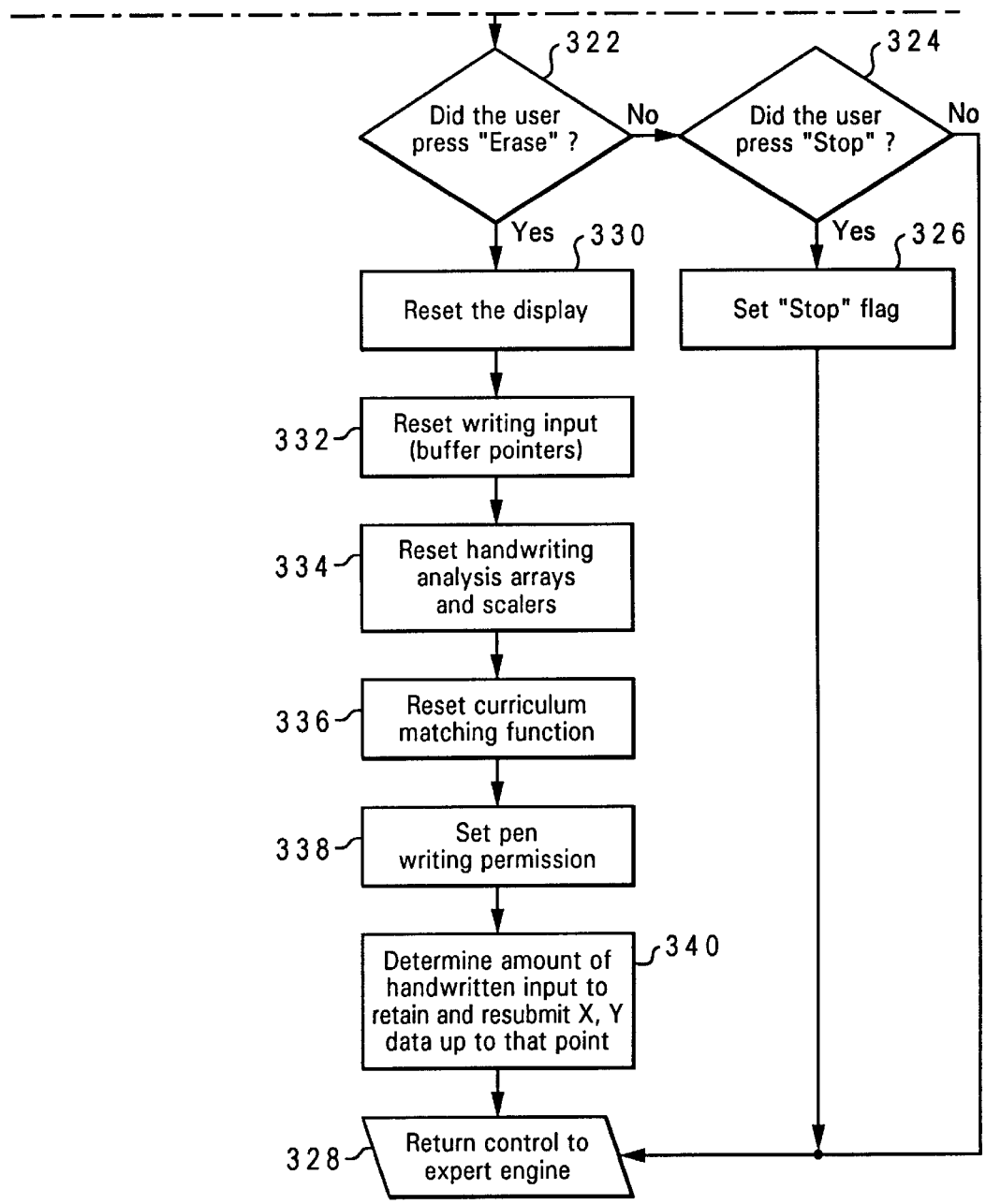

FIG. 5 is a flow chart illustrating internal control functions 300 of the input/output module 158. Upon call from the expert engine 146, the program starts (step 302). Initially, a writing environment is displayed (step 304, see also FIG. 1). Next, at step 306 several data structures are initialized including pointers into a writing input buffer and handwriting analysis arrays and scalars (described below). Then, the curriculum matching function is reset (step 308). At this point, the program enters a graphical input mode, i.e. the student given pen (or mouse) writing permission (step 310).

Step 312 provides for entry and exit control from a data analysis loop comprising steps 314, 316. The exit conditions are described in greater detail below in connection with discussion of the particulars of the handwriting recognition engine. Once writing permission has been given the student (step 310) the student generally determines when he or she has completed the task, typically by using the mouse/cursor to actuate a control button in the user interface 71. As long as exit conditions are not met, step 312 returns program execution to step 314 to determine if any data relating handwritten inputs is unanalyzed (this involves a comparison between the current position of the input pointer and a pointer indicating where analysis is). If there is any data to be analyzed the yes branch from step 314 moves program execution to step 316 to call the handwritten character analysis and recognition engine. Program execution is returned to step 312 after step 316 or along the No branch from step 314. Steps 312, 314 and 316 typically provide repeated calls to the handwritten character analysis and recognition engine during user entry of handwritten letters. As will be described below, the analysis and recognition engine to some extent anticipates what the user will write, in part to improve responsiveness of the system.

Once the exit conditions have been detected at step 312, the control program handles exit from a graphical entry mode and any special user requests (e.g. erasure of material). Program execution moves to step 318 which provides for turning off pen writing permission. Next, at step 320 a message is passed to the handwritten character recognition engine indicating the data entry is complete. At step 322 the program determines if the user has requested erasure of previously entered material. If not, the program determines if the user "pressed" a stop control button on the user interface 71. If Yes, step 326 sets a stop flag. After step 326 and along the No branch from step 324 program execution is returned to the expert engine (step 328).

Steps 330–340 provide erasure control following the Yes branch from program step 322. At step 330 the writing environment display is reset. Next, at step 332 writing input buffers are reset as indicated by user movement of the light pen or mouse. At step 334 the handwriting analysis arrays and scalars are reset. Step 336 provides for resetting the curriculum matching function. At step 338 pen writing permission (for erasure) is set to on.

At step 340 user input is traced to determine material to remove from the x,y coordinate data and the retained data is passed to the handwritten character recognition engine. Control is thereupon returned to the expert engine.

Figure 6:
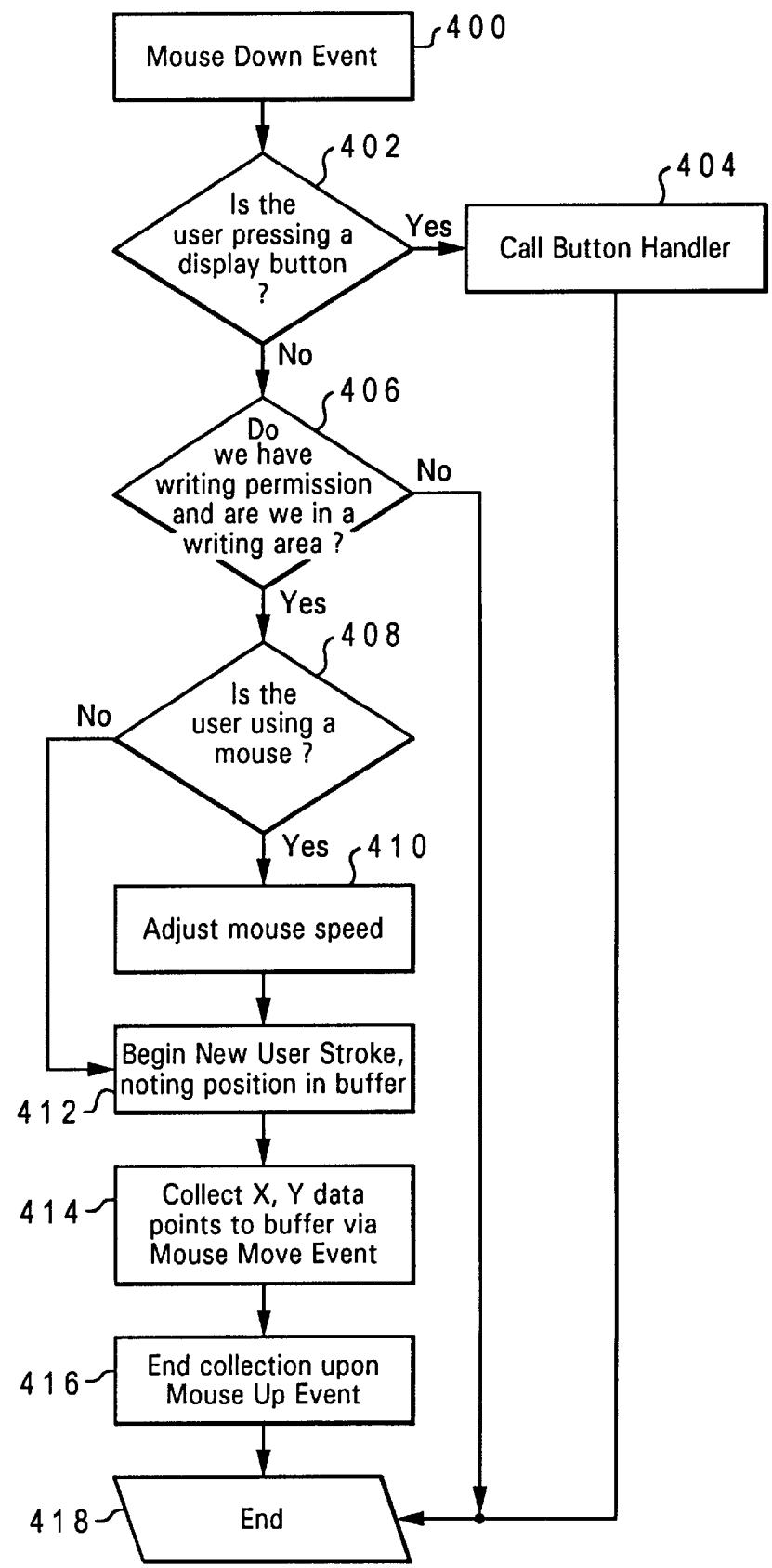
FIG. 6 is a detailed flow chart illustrating handling of a coordinate input device utilized for practicing handwriting.

FIG. 6 is a flow chart illustrating a subroutine handling mouse events for the input/output module 158, particularly the steps providing for collecting data responsive to entry into a graphical operation mode. Graphical operations are executed only after a mouse down event, or the user action of moving a stylus to a digitizing pad, or touching a light pen to the screen, detected at step 400. At step 402 the program determines if the mouse down event occurred with the cursor hot spot positioned over an icon representing a program subsidiary function, such as exit from the program, indicating a use other than graphical inputs. If YES, the program advances execution to a button handler (step 404) to handle the event and the routine is exited (step 418). Similarly, step 406, executed along the NO branch from step 402 actually determines if the input/output module 158 has authorized graphical inputs from a user. The NO branch from step 406 also advances execution to the exit step 418.

The YES branch from step 406 is taken after a Mouse down event coincides with program permission to make graphical entries. Step 408 checks whether the user is using a light pen or a mouse 80. Step 410, executed in case a mouse is used, adjusts cursor speed responsive to mouse movement to aid the pedagogical process. Step 414, occurring after either steps 408, 410 sets a pointer into a x,y coordinate buffer marking the beginning of a new stroke. Upon each mouse (or light pad) interrupt another entry is added to the x,y coordinate buffer for the current location of the mouse cursor or light pen. Step 416 occurs upon an interrupt associated with a mouse (or light pen) up event, and sets a pointer into the x,y coordinate buffer marking the end of a stroke. Step 418 indicates exit from the subroutine. The term stroke or curve as used herein is intended to apply to the graphic construction occurring between a mouse down and a mouse up event. The definition is somewhat different than used in some handwriting recognition engines which define a stroke as a single-direction continuous pen movement, that is, there is an additional stroke if there is a sudden change of direction in a letter such as a "V".

Figure 7:
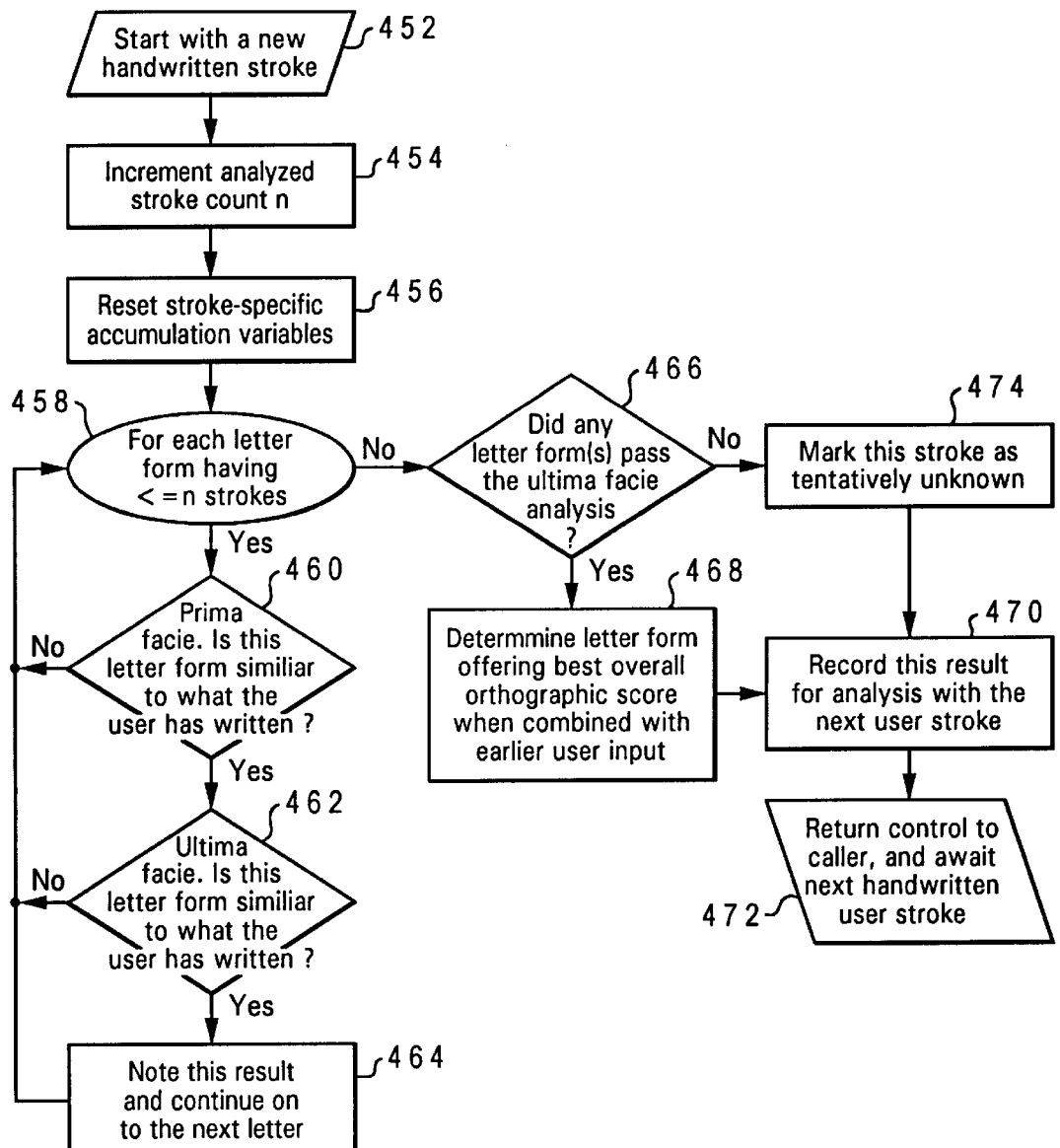
FIG. 7 is a detailed flow chart illustrating interaction of the coarse and fine letter analysis and scoring engines.

FIG. 7 illustrates program flow through the coarse and fine stroke and letter analysis functions. The subroutine is entered at step 452 where it is indicated that a new handwritten stroke has been entered by a user. At step 454 the analyzed stroke count n is incremented. Next at step 456 various stroke specific accumulation variables for the coarse and fine evaluation engines are reset. It will be understood that a user stroke is an ordered set of x,y coordinate pairs which are related by the scoring routines to a model stroke . The variables used for scoring are among the variables that need to be reset.

Step 458 initiates a control loop. The number of strokes being analyzed is known and is used to eliminate from consideration all model (both normative and subnormative) letters having more than the number of strokes entered by the user. Step 460, and, depending on the outcome of step 460, steps 462 and 464 are executed for the remaining letters. Step 460 represents a decision taken after calling the coarse letter-analysis subroutine illustrated in FIG. 8. If a letter is not a possible match processing returns to loop control 458 and possible exit from the loop. Possible matches, determined by a low error score, are passed on to step 462. Step 462 represents a call of the fine stroke and letter recognition subroutine illustrated in FIGS. 9 and 10 and a decision taken on the score returned from the subroutine. A negative result returns processing to step 458. Determination of a possible letter match advances processing to step 464 to store the possible match and a score for the user character against the possible match.

After all letter forms with the proper number of strokes have been compared to the user entered stroke(s), the NO branch is taken from step 458 to step 466 where a check is made to determine if one or more candidate model letters were noted at step 464. If candidate letters for a match exist, step 468 represents the automatic selection of the model character which the user character best matches, as determined by the scoring routines. At step 470 this result is stored for use the next time through the routine (since additional user input can modify interpretation of prior input). If no candidate model letters were found at step 466, the user character is tentatively marked as unknown (step 474), the result is noted at step 470. After step 470 processing control is returned to the calling program (step 472). Responsiveness of the handwriting recognition engine is enhanced by carrying out the recognition process in two ways. First a quick check subroutine, depicted in FIG. 8 reduces the number of possible matches by performing a cursory check over collected set of normative and substandard letters. Second, a detailed check and scoring subroutine then identifies the most likely letter to have been written and scores the letter against the normative standards.

Figure 8:
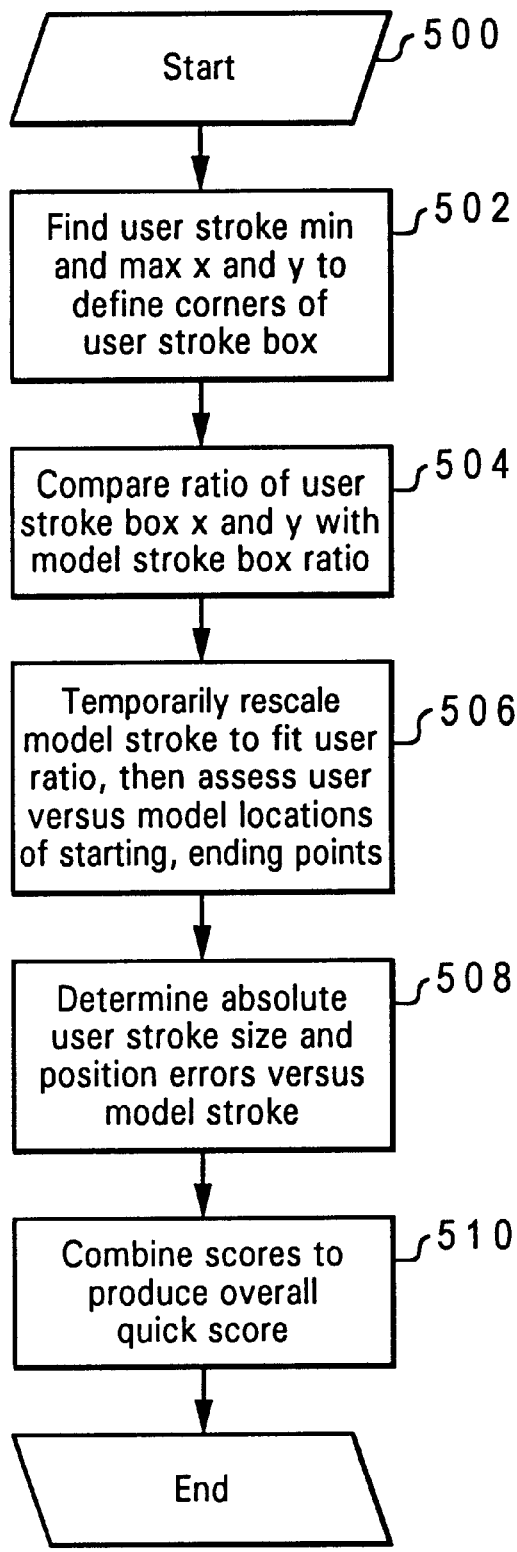
FIG. 8 is a coarse letter analysis and scoring engine.

FIG. 8 is a flow chart illustrating the quick check subroutine of the inventive handwriting recognition engine.

After entry to the subroutine at step 500, the program finds the minimum and maximum x and y coordinates for a completed (or composite) stroke and uses the coordinates to define a minimum and maximum user stroke box (step 502). Next, at step 504, the subroutine determines the ratio of width to height ($x_{max}-x_{min}/y_{max}-y_{min}$) for the user stroke box and compares it to a model stroke box ratio to determine a scaling factor. Next, with step 506, the model stroke ratio is rescaled to fit the user stroke ratio. Then the x,y coordinate buffer for the stroke is accessed to determine starting and ending locations for a stroke. Similarly, the rescaled models in the character sets 164 are accessed, allowing a comparison of the starting and ending locations for the models with the stroke. Then, at step 508, the user absolute stroke size and position errors versus the several models are determined. At step 510, the stroke size and position errors are combined to produce a quick score for each normative and substandard character. Letters for which the user stroke exhibits too high an error score are discarded as candidates. At this point, step 510, the subroutine is exited.

Figure 9:
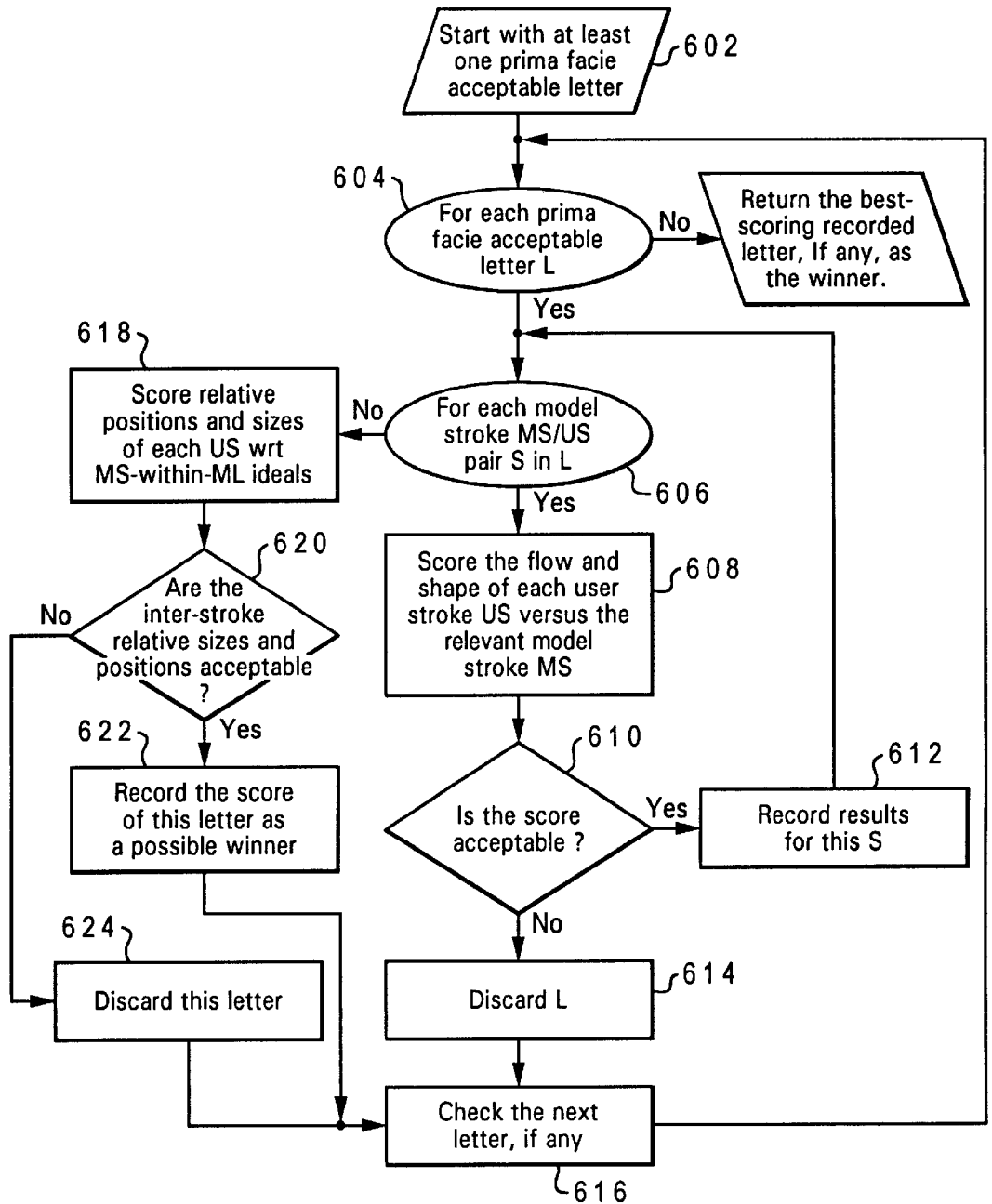
FIG. 9 is a control routine for the fine stroke formation and letter analysis and scoring engine.

FIG. 9 represents an overview of the fine stroke analysis and letter recognition engine of the present invention. Because of the computational requirements of the fine stroke analysis engine, the coarse engine just described is used simply to prevent invocation of the fine engine for model letters which are obviously not candidates as matches to user entered figures. Given enough computational power however, the coarse engine could be discarded without effecting the basic operation of the invention. Fine stroke analysis and letter recognition is not just a handwriting recognition engine, but provides data for evaluation of the quality of a user entered figure against model letters, both in terms of final appearance and in terms of user faithfulness to a normative sequence or flow of entered points for the model Step 602 is invoked whenever at least one prima facie candidate model letter for a match is detected by the coarse engine of FIG. 8. The program loop is controlled at step 604, which simply indicates that the fine evaluation is carried out for all of the candidate model letters passed by the coarse check. The loop control is needed if candidate model letters are accumulated in the process depicted in FIG. 7. Program control is returned to the calling process along the NO branch from step 604 via step 626 along with the model letter against which the user character obtained its best (i.e. lowest) score.

Step 606, along the YES branch from loop control box 604, provides a control point for a sub-loop used to evaluate the sequence and direction of segment formation of a stroke by a user against the normative sequence and direction of strokes in the model letters. Step 606 provides recognition that some letters and characters are multiple stroke letters and that each stroke should occur in sequence and that the stroke should be drawn in the proper direction(s): Hence the loop is executed (the YES branch) for each stroke. Step 608 along the YES branch from step 606 represents a call to a scoring subroutine to determine a score for the User Stroke (US) versus the tentatively identified corresponding Model Stroke (MS) (See FIG. 10). At step 610 the score returned from step 608 is compared to a maximum allowable score. If the score is acceptable, processing loops back to step 606 via step 612 (indicating storage of the resulting score) to determine if additional strokes must be evaluated. If the score is too high the NO branch is taken from step 610 to step 614 and the candidate model letter L is discarded. Execution is then returned to step 604 via information box 616.

Step 618, along the NO branch (indicating stroke sequence evaluation is complete) from step 606, initiates appearance evaluation of the user stroke compared against the model character. Step 618 provides that the position and size of the user strokes are compared with respect to the model strokes within a model letter (as described above, characters are rescaled as part of the coarse evaluation, allowing a point to point comparison of stroke starting and ending points as well as the relative dimensions of the user and model letters). At step 620 the score is evaluated and if too high the model letter candidate is rejected and discarded along the NO branch (step 624). If the score is a passing score, the result is saved (step 622) along the YES branch and processing is returned to step 604 via step 616 as already described.

Figure 10A:
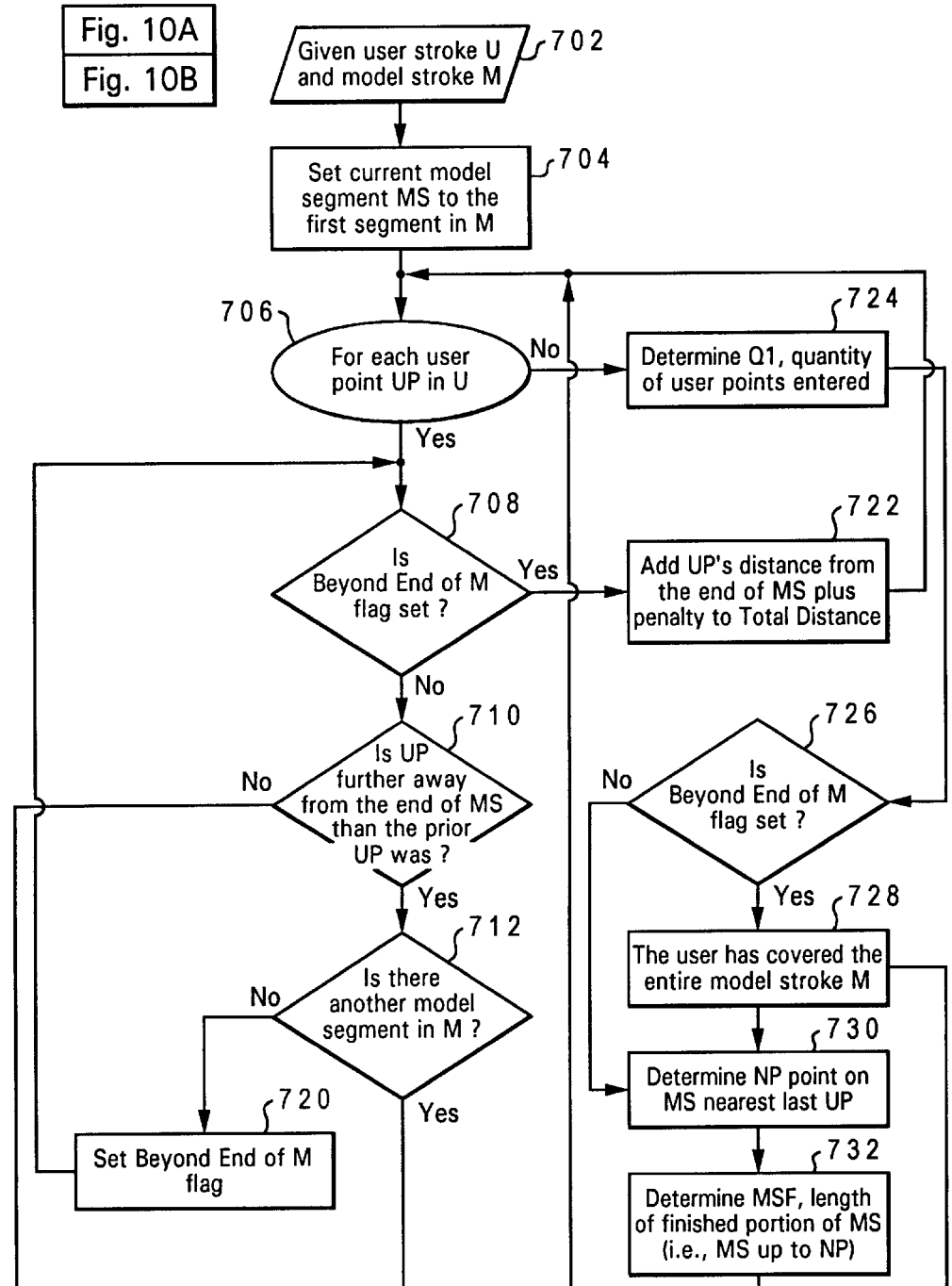
FIG. 10 is the fine stroke formation and letter analysis and scoring engine.
Figure 10B:
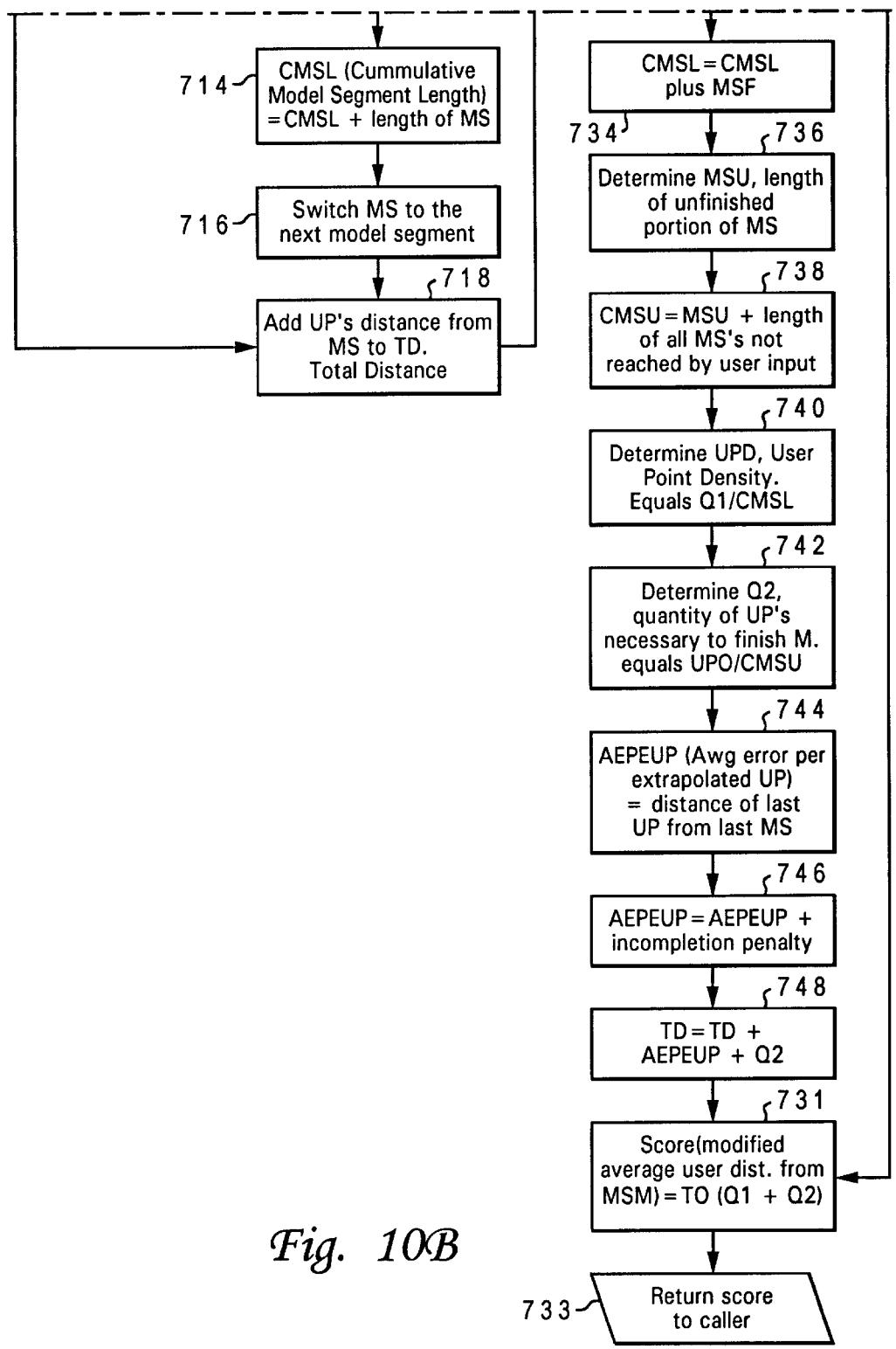

FIG. 10 represents the stroke scoring routine invoked at step 608. The process is entered at step 702 with the user stroke data U and the data for a candidate model stroke M. As described above, as used herein a stroke may comprise one or more changes in direction. However, the model segments which are used to describe model strokes are pairs of x,y coordinates describing the beginning and ending of line segment. A "circular" letter such as a C or an O is described as a series of very short straight-line segments, but only one stroke. A user entered stroke is presented as a plurality of segments defined by pairs of x,y coordinates. However, user entered "segments", even for perfectly formed letters, do not correspond to model segments in model strokes because user segments are defined by the occurrence of mouse (or light pen) interrupts.

Step 704 is an initialization step where the current model segment to be analyzed is set equal to the first segment in the model stroke. Next, step 706 determines if all user points UP in the data set U have been evaluated. If not, step 708 determines if a Beyond End of Model flag has been set, indicating that the user points in some way extend beyond the model or overrun portions of the model, for example if it has been determined that a user has written an object shaped like an "O" by tracing its shape twice. Obviously, the flag is initially not set. As long as the Beyond End of Model flag is unset, processing continues to step 710 where the current user point UP is further away from the end of the model segment than the prior user point was. The more frequent result should be negative, in which case the user point may be mathematically compared for departure from a line segment defined by the beginning and ending points of the current model segment. This occurs at step 718 which indicates determination of the user points right angle distance from the model segment and addition of the calculated distance to the variable TD, which represents the accumulated distance of the user points from all of the line segments. (The reader should remember that rescaling of either the model letter or the user generated character has been done so there is no penalty here for an overly small or overly large letter if correctly formed). Scoring may be seen to be purely linear; however, other scoring rules are possible. Proper direction of constructing a segment is also evaluated. For example, if a user writes an otherwise perfectly positioned segment backwards, a substantial deviation will be detected between the beginning and ending user points and the beginning and ending points of the model segment.

If the condition at step 710 is true it is taken as an indication that user points in the user entered character should be evaluated against a subsequent segment in the model stroke, if any (step 712). If there are no further segments in the model stroke, the user entered character extends beyond, or is tracing over, the current model phonic character under evaluation. Processing is routed to step 720 to set the Beyond End of Model flag and processing returns to step 708. Once the Beyond End of Model flag is set decision step 708 will route processing to step 722 where distance of the remaining user points (UP) from the end of the model segment is determined and added to TD (total distance). An arbitrary penalty may be added related to the number of user points which exist past the last point of the model segment or if any user points exceed a minimum threshold distance past the end of the model segment.

If at step 712 there remain model segments to evaluate, the YES branch advances processing to step 714 where a variable CMSL (Cumulative Model Segment Length) is updated to add the scaled length of the current model segment. Next, at step 716, the subroutine switches evaluation to the next model segment. Next, at step 718, the distance of the current user point from the newly current model segment is added to TD (total distance). Processing is returned to step loop control box 706.

Once all user points are evaluated, step 706 directs processing to step 724 where the number of user points $Q_1$ (typically the number of mouse interrupts recorded between a mouse down and a mouse up event) is determined. At step 726 the Beyond End of Model stroke flag is checked. If the flag is not set the user entered stroke must be evaluated for completeness along the NO branch. If the flag is set, then the entire model stroke has necessarily been completed (as indicated by information box 728) and processing can advance directly to step 731 to determine a score for the user stroke against a model letter. The score (which here is a linear relationship to the average user distance from the model segments of the model stroke) is found by evaluating the function Score=$TD/(Q_1+Q_2)$, where $Q_2$ is 0. The routine is then exited by returning the Score to the calling routine (step 733).

Returning to step 726, processing is evaluated along the NO branch is now discussed. First the closest point in the model segment (NP) to the last entered user point is located (step 730). At step 732 the length of the finished portion (MSF) of the model segment which the user point is nearest is determined. Next, at step 734 the variable CMSL is updated by adding MSF to it. At step 736 a value MSU (length of unfinished portion of the model segment) is calculated, it being simply the length of MS minus MSF. At step 738 a new value CMSU is determined by adding MSU and the lengths of all unreached (by the user points) model segments in the model letter. At step 740 the average user point density is determined by dividing $Q_1$ by the variable CMSL determined in step 714. At step 742 a new variable $Q_2$ is estimated to represent the expected number of user points had the user completed a character which fully mapped into a model segment. The estimate is made by multiplying the point density by the cumulative length of the unfinished model segments. At step 744 a variable AEPEUP (average error per extrapolated user point) is set equal to the distance from the actual last user point to the last point in the model segment. At step 746 the error value for AEPEUP is incremented by an incompletion penalty. At step 746 TD is reset to equal the old TD+AEPEUP×$Q_2$. Steps 731 and 733 are now executed as described above, except that $Q_2$ is now non-zero.

In the present handwriting recognition engine a stroke is defined as any figure which can be constructed without lifting a light pen from the screen, or initiating a mouse up event, even if it includes a sudden change of direction. Nonetheless, some forms of some capital letters may comprise as many as four strokes. Part of the definition of an "exit condition" for step 312 in FIG. 5 therefore includes how many strokes to add together to define a composite letter to be analyzed in the handwriting recognition engine called at step 316. Absolute proximity of component strokes is one condition. In the case of two letters placed close together, where an intermediary component stroke could be part of either letter, the assignment of the stroke which produces the better overall score prevails.

Figure 11:
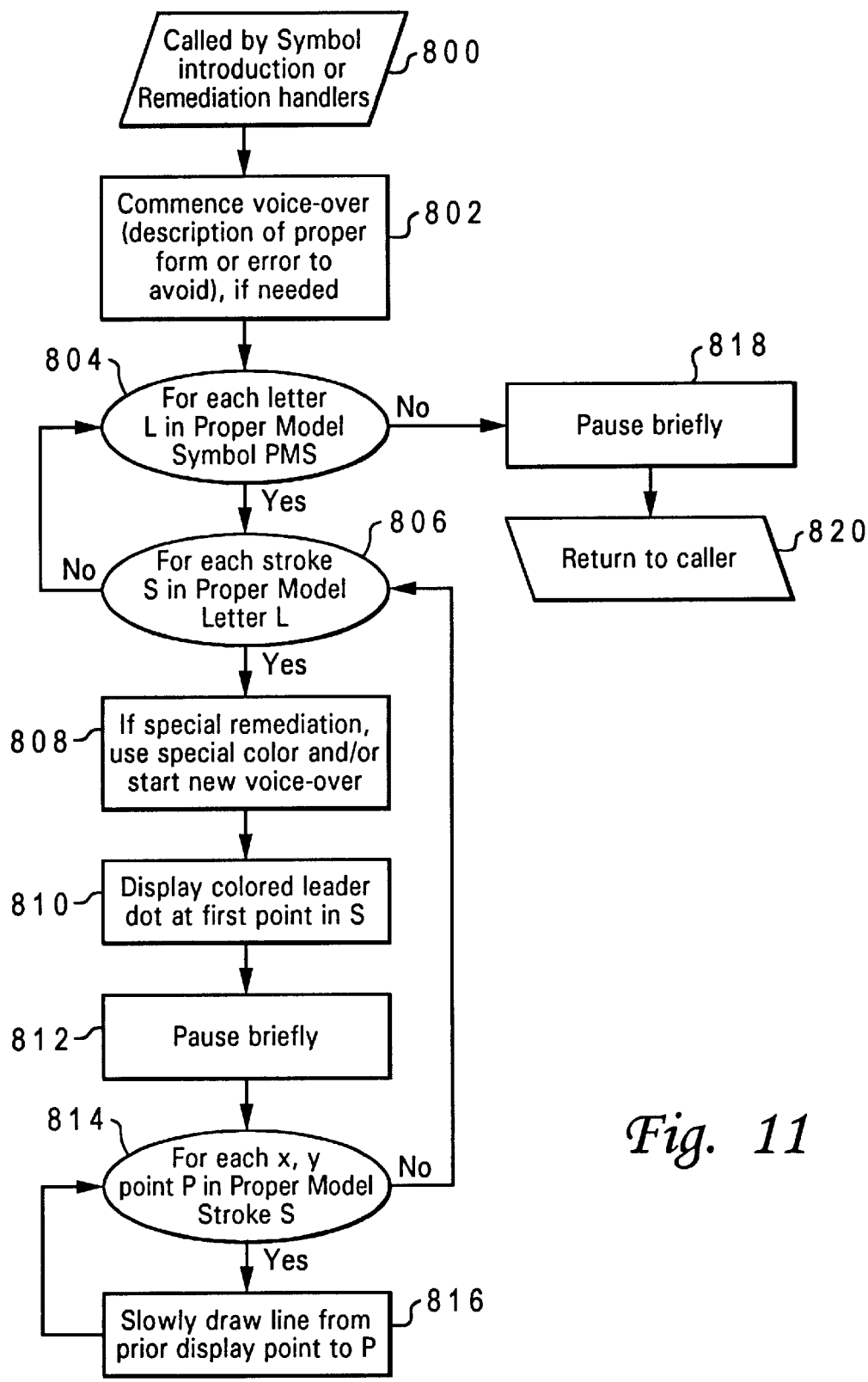
FIG. 11 is a possible subroutine called to provide symbol introduction and remediation functions of the overall system.

FIG. 11 is a possible subroutine called to provide symbol introduction and remediation functions (step 800) of the overall system, not character evaluation. However, it is a vehicle by which normative characters to which the student is expected to conform her handwriting are introduced. At step 802 a voice-over description of a character or of an error to be avoided is made. Step 804 handles a control loop which leads a student through all of the letters in a given symbol (some symbols have more than one letter, e.g., "th", or "ing"). As long as letters remain the YES branch is taken to step 806 which guides the subroutine through all of the strokes S of a given normative model letter L. If strokes remain, step 808 follows, where, if in special remediation mode, the cursor color may be changed and a new voice over started. Next, at step 810, a special colored dot is exhibited to indicate the proper point to start a stroke S. Step 812 indicates a program pause. Next, steps 814 and 816 are executed to construct and display the model segment S for the user. Once completed, processing returns to step 806 to determine if all strokes are completed for a letter. Once all strokes are completed, step 806 returns processing to step 804 to determine if all letters have been completed. Once all letters have been completed the routine is exited by returning control to the calling routine (steps 818 and 820).

The present invention supports a structured-phonetic, multisensory teaching program which implements in a computer driven interface many components of the Orton-Gillingham approach of reading instruction, particularly apt for individuals with dyslexia. Enhanced reading, writing, and spelling instructional effectiveness for parents, tutors, and teachers is done through consistent reinforcement of linguistic concepts and rules with a rotating word bank. The invention supports implementation of the pedagogic methods of the Orton-Gillingham approach by providing orthographic handwriting recognition, that is recognizing and pedagogically evaluating handwriting. This is done by noting, remediating or rejecting letters constructed by students which are pedagogically nonnormative in appearance, sequence of construction or both even if the end appearance is clearly recognizable, including the possibility that the letter is perfect in end appearance.

While the invention has been particularly shown and described with reference to a preferred embodiment, it will be understood by those skilled in the art that various changes in form and detail may be made therein without departing from the spirit and scope of the invention.

What is claimed is:

1. A computer implemented method of evaluating handwriting, comprising the steps of:

providing a plurality of letter templates, each letter template including stroke information specifying shape and direction of construction information;

responsive to user input, collecting one or more ordered sets of data points corresponding to strokes in a user constructed character, each ordered set defining shape information and direction of construction information for the stroke;

selecting at least a first candidate letter template from among the letter templates: and comparing the strokes of the user constructed character to strokes from the candidate letter template for correspondence to the direction of construction information and for fit to the shape information.

2. The computer implemented method of claim 1, wherein the step of selecting further includes the step of:

provide stroke ratio boxes for the letter templates; and screening the set of letter templates for possible matches to the user constructed character by calculating a stroke ratio box for the user constructed character and comparing stroke ratio boxes for the letter templates against the stroke ratio box for the user constructed character and further comparing starting and ending locations for the letter templates against starting and ending locations for the user constructed character to generate possible matches.

3. The computer implemented method of claim 2, further comprising the steps of:

generating a writing environment on a computer display device;

responsive to user movement of an input device to move a display cursor into the writing environment, generating a graphical track of the user's further movement of the input device representing the user constructed character;

collecting directional coordinate data corresponding to the graphical tract; and utilizing the ratio boxes to scale the strokes of the user generated character to the strokes of the letter templates for coordinate to coordinate comparison of fit.

4. The computer implemented method of claim 3, further comprising the steps of:

including normative and subnormative letter templates among the plurality of letter templates;

comparing the possible matches among the normative and subnormative letter templates for a best match letter template to the user constructed character measured by the flow, shape, relative position and relative size of the strokes for each possible match and the user constructed character and indicating scoring of the user constructed character against at least one letter template including allowing rejection of recognizable letters best matched to a normative letter template for poor conformity to the normative letter template, and acceptance a user constructed character best matched to a subnormative letter template if conformance is high.

5. The computer implemented method of claim 4, further comprising the step of providing a mouse for user input of graphical figures.

6. The computer implemented method of claim 3, further comprising the steps of:

comparing the possible matches among the letter templates for a best match letter template to the user constructed character measured by flow, shape, relative position and relative size of the strokes for each possible match and the user constructed character; and indicating scoring of the user constructed character against at least one letter template including allowing rejection of recognizable letters best matched to a letter template for poor conformity to the letter template.

7. The computer implemented method of claim 1, wherein the step of comparing further includes the steps of:

responsive to the collection of ordered sets of data points, screening among the letter templates for a best match to the user constructed character by comparing the flow, shape, relative position and relative size of the strokes and the user constructed character.

8. The computer implemented method of claim 7, further comprising the step of providing a mouse for user input of graphical figures.

9. A data processing system for evaluating handwriting, comprising:

a data storage element;

a data structure in the data storage element providing a plurality of normative and subnormative letter templates defining strokewise shape and direction of construction information;

means responsive to user input for collecting directionally ordered sets of data points for strokes in a user constructed character;

means for selecting candidate letter templates from the plurality of normative and subnormative letter templates; and means for comparing the user constructed character against at least a candidate letter templates for correspondence of the ordered set of data points to the direction of construction and shape information for the candidate letter templates.

10. The data processing system of claim 11, further comprising:

means executing on the collected directionally ordered data for screening the set of normative and subnormative letter templates for possible matches to the user constructed character by comparing stroke ratio boxes for the letter templates against a stroke ratio box for the user constructed character and for further comparing starting and ending locations for the letter templates against starting and ending locations for the user constructed character.

11. The data processing system of claim 10, further comprising:

a writing environment imaged on a display device;

means responsive to user movement of an input device moving a display cursor into the imaged writing environment for generating a graphical track of the user's further movement of the input device representing the user constructed character.

12. The data processing system of claim 11, wherein the means for evaluating further comprises:

screening the possible matches among the letter templates for the best match letter template to the user constructed character by comparing the flow, shape, relative position and relative size of the strokes for each possible match and the user constructed character.

13. The data processing system of claim 12, further comprising:

a mouse for user input of graphical figures.

14. The data processing system of claim 10, wherein the means for evaluating further comprises:

means responsive to the collection of directional coordinate data for screening among the letter templates for a best match letter template to the user constructed character by comparing the flow, shape, relative, position an relative size of the strokes comprising each possible match and the user constructed character.

15. The data processing system of claim 9, wherein the means for evaluating further comprises:

means for selecting strokes from the user input for the means for comparing.

* * * * *